United States Patent
Sharp

(10) Patent No.: US 11,938,944 B2
(45) Date of Patent: *Mar. 26, 2024

(54) METHOD AND SYSTEM FOR DETERMINING AND DISPLAYING A WADING SITUATION

(71) Applicant: Robert Bosch GmbH, Stuttgart (DE)

(72) Inventor: Jesse Sharp, Glenroy (AU)

(73) Assignee: ROBERT BOSCH GMBH, Stuttgart (DE)

( * ) Notice: Subject to any disclaimer, the term of this patent is extended or adjusted under 35 U.S.C. 154(b) by 506 days.

This patent is subject to a terminal disclaimer.

(21) Appl. No.: 17/049,760

(22) PCT Filed: Jul. 1, 2019

(86) PCT No.: PCT/EP2019/067559
§ 371 (c)(1),
(2) Date: Oct. 22, 2020

(87) PCT Pub. No.: WO2020/025232
PCT Pub. Date: Feb. 6, 2020

(65) Prior Publication Data
US 2021/0237741 A1 Aug. 5, 2021

(30) Foreign Application Priority Data
Jul. 31, 2018 (DE) .......................... 102018212783.2

(51) Int. Cl.
*H04N 5/44* (2011.01)
*B60W 40/02* (2006.01)
*B60W 50/14* (2020.01)

(52) U.S. Cl.
CPC ............ *B60W 40/02* (2013.01); *B60W 50/14* (2013.01); *B60W 2420/54* (2013.01); *B60W 2520/16* (2013.01); *B60W 2555/20* (2020.02)

(58) Field of Classification Search
CPC .. B60W 40/02; B60W 50/14; B60W 2420/54; B60W 2520/16
See application file for complete search history.

(56) References Cited

U.S. PATENT DOCUMENTS

| 9,399,473 B2 | 7/2016 | Hoare et al. |
| 9,533,575 B2 | 1/2017 | Tran et al. |

(Continued)

FOREIGN PATENT DOCUMENTS

| DE | 102012015764 A1 | 2/2014 |
| GB | 2496051 A | 5/2013 |

(Continued)

OTHER PUBLICATIONS

International Search Report for PCT/EP2019/067559, dated Oct. 4, 2019.

*Primary Examiner* — Munear T Akki
(74) *Attorney, Agent, or Firm* — NORTON ROSE FULBRIGHT US LLP; Gerard A. Messina

(57) ABSTRACT

A driver assistance system includes a first measuring device for determining the distances to a water surface, which includes at least two distance sensors. A first distance sensor measures a first distance to a water surface, in that the distance is determined perpendicularly downward from the first sensor to the water surface, and the second distance sensor measures a second distance to a water surface, in that the distance is also determined perpendicularly downward from the second sensor to the water surface. A second measuring device determines an instantaneous pitch angle of the vehicle. A processing unit is coupled to the first and second measuring devices. The processing unit determines an instantaneous water surface plane as a function of the first distance, the second distance, and the instantaneous pitch (Continued)

angle of the vehicle. A display unit indicates the instantaneous water surface plane in relation to the vehicle.

15 Claims, 3 Drawing Sheets

(56) References Cited

U.S. PATENT DOCUMENTS

| | | | |
|---|---|---|---|
| 9,987,924 B2 | 6/2018 | Popham et al. | |
| 2014/0293056 A1* | 10/2014 | Popham | G01F 23/804 |
| | | | 348/148 |
| 2014/0293746 A1* | 10/2014 | Tran | G01S 7/52004 |
| | | | 367/93 |
| 2014/0371976 A1* | 12/2014 | Gilling | G01F 23/80 |
| | | | 701/29.1 |
| 2015/0033846 A1* | 2/2015 | Tran | G01F 23/24 |
| | | | 73/304 C |
| 2015/0046071 A1* | 2/2015 | Clarke | B60W 10/04 |
| | | | 701/112 |
| 2015/0066339 A1* | 3/2015 | Hoare | B60W 50/14 |
| | | | 701/116 |

FOREIGN PATENT DOCUMENTS

| | | |
|---|---|---|
| GB | 2520298 A | 5/2015 |
| WO | 2012080435 A1 | 6/2012 |
| WO | 2012080437 A1 | 6/2012 |
| WO | 2012080438 A1 | 6/2012 |
| WO | 2012123555 A1 | 9/2012 |
| WO | 2013120970 A1 | 8/2013 |

* cited by examiner

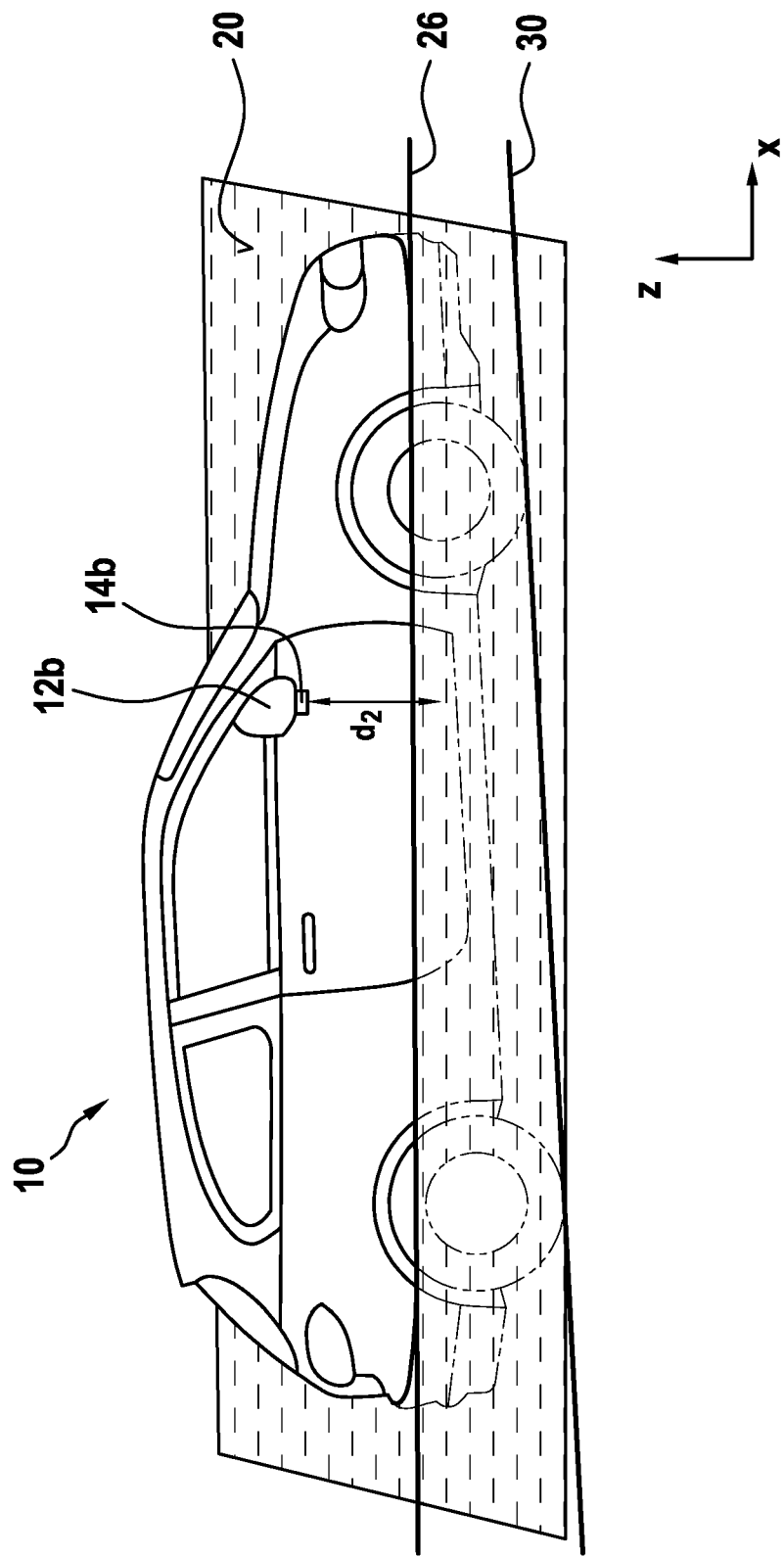

METHOD AND SYSTEM FOR DETERMINING AND DISPLAYING A WADING SITUATION

FIELD

The present invention relates to a driver assistance system and a method for determining a wading situation as well as a vehicle including a driver assistance system according to the present invention, an instantaneous water surface plane being determined and displayed to the driver in relation to the vehicle.

BACKGROUND INFORMATION

Off-road passenger vehicles, such as all-terrain vehicles or so-called SUVs (sport utility vehicles) for example, are designed to cross water bodies. If the vehicle has to be immersed in water to a certain extent, this process is referred to as a "wading process." Such a maneuver requires a great deal of caution and circumspection from the driver, since the driver usually neither knows how deep the water body is that he/she intends to cross nor how the terrain below the water surface is conditioned. This problem is further intensified by adverse environmental conditions, such as darkness, fog, rain or contaminated water. It was traditionally recommended that the driver exit the vehicle and examine the water depth and the condition of the terrain below the water surface with the aid of suitable means prior to crossing the body of water.

Assistance systems that make it easier for the driver to manage a wading process are described in the related art. In PCT Application No. WO 2012/123555 A1, a vehicle is described, for example, that includes two ultrasonic sensors, each being situated at the side mirrors of the vehicle and detecting the distance to a water surface below the side mirrors, as well as a water contact sensor situated at the underbody of the vehicle.

In PCT Application No. WO 2012/080435 A1, PCT Application No. WO 2012/080437 A1 and PCT Application No. WO 2012/080438 A1, vehicles are described that include display systems that represent a side view of the vehicle together with a measured instantaneous wading depth and a maximally admissible wading depth (wading limit). The instantaneous wading depth and the wading limit are each illustrated as straight lines. The maximal wading depth, i.e., the wading limit, usually results from the structural conditions of the vehicle in question. The air inlets of an internal combustion engine may therefore not be immersed in water, for example. In this case, it may be displayed to the driver with the aid of a percentage value as to how deep the vehicle is instantaneously below water with regard to the wading limit.

SUMMARY

The present invention is directed to detecting more accurate information about the instantaneous wading situation of a vehicle, so that the driver is provided with a more accurate illustration of the instantaneous wading situation, which in particular takes into account the structural particularities of the vehicle. A wading situation refers to the instantaneous position of the vehicle in relation to a water surface, in which the vehicle is immersed at least partially. The wading situation is characterized, for example, by the wading depth, the inclination of the ground and/or an inclination of the vehicle in the longitudinal direction and/or in the transversal direction in relation to the horizontal.

This object may be achieved with the aid of a driver assistance system, as well with the aid of a method for determining a wading situation of a vehicle, in accordance with example embodiments of the present invention.

Preferred refinements of the present invention are described herein.

In accordance with the present invention, a vehicle may have different wading limits depending on the position at its exterior. It is therefore necessary to determine not only one value as the instantaneous wading depth, but to determine an instantaneous water surface plane in relation to the vehicle and to display same to the driver.

According to a first aspect of the present invention, a driver assistance system is provided that is designed to determine this type of a wading situation of a vehicle. In accordance with an example embodiment of the present invention, the driver assistance system includes a first measuring device for determining the distances to a water surface, which encompasses at least two distance sensors. A first distance sensor is designed to be situated at the vehicle laterally with regard to a first side of the vehicle. A second distance sensor is designed to be situated at the vehicle laterally with regard to a second side of the vehicle, the second side being opposite to the first side. The first distance sensor is designed to measure a first distance to a water surface, in particular in that the distance is determined perpendicularly downward from the first sensor to the water surface, and the second distance sensor is designed to measure a second distance to a water surface, in particular in that the distance is also determined perpendicularly downward from the second sensor to the water surface. The first distance sensor and the second distance sensor are preferably each designed as an ultrasonic sensor. The particular installation height of the first and the second distance sensors in relation to the vehicle is in particular known or established.

Furthermore, the example driver assistance system includes a second measuring device for determining an instantaneous pitch angle of the vehicle. The pitch angle describes the longitudinal inclination of a longitudinal axis of the vehicle in relation to the horizontal plane. The second measuring device may include an acceleration sensor and wheel rotation sensors, for example.

Furthermore, the example driver assistance system includes a processing unit that is coupled to the first measuring device and to the second measuring device. The processing unit is designed to determine an instantaneous water surface plane as a function of the first distance, the second distance, and the instantaneous pitch angle of the vehicle. The driver assistance system moreover includes a display unit that is designed to represent the instantaneous water surface plane in relation to the vehicle.

In one preferred embodiment of the present invention, the driver assistance system further includes a memory unit, particular assigned wading limits being stored in the memory unit for a plurality of specific positions at the vehicle. The processing unit is designed to determine for each of the specific positions whether the assigned wading limit is above or below the instantaneous water surface plane. The specific positions may involve air inlets or other positions, for example, through which water might enter the vehicle, thereby potentially resulting in damage or operating failure of the vehicle.

It is furthermore preferred that the processing unit is designed to determine for each of the specific positions the instantaneous distance of the assigned wading limit from the instantaneous water surface plane.

It is furthermore preferred that the display unit is designed to output a warning if the instantaneous distance of a specific position falls below a specific limiting value with regard to the assigned wading limit. It is furthermore preferred that the display unit is designed to indicate, in particular in real time, a perspective or three-dimensional illustration of the vehicle together with a perspective or three-dimensional illustration of the instantaneous water surface plane. The warning may take place, for example, in that an illustration of the vehicle is indicated on the display unit and the affected specific position is highlighted in color and/or through other visual markings. Alternatively or additionally, an acoustic and/or visual warning may be output, for example a voice message that indicates the affected specific position.

The display unit is designed, in particular, to represent a section line of the vehicle outer contour with the instantaneous water surface plane in a visually highlighted manner and to represent the instantaneous distances of the specific positions with regard to the assigned wading limits.

According to a second aspect of the present invention, a vehicle is provided that includes a driver assistance system as described above.

The first distance sensor and the second distance sensor are preferably each situated at a side mirror of the vehicle, in particular in such a way that they are able to measure the distance to a water surface in a perpendicularly downward manner. The particular installation height of the first and the second distance sensors at the vehicle is in particular known or established.

The specific positions of the vehicle include, for example, positions having air inlets.

According to a further aspect of the present invention, a method for determining a wading situation of a vehicle is provided, the vehicle including a first measuring device for determining the distances to a water surface encompassing at least two distance sensors. Here, a first distance sensor is designed to be situated laterally with regard to a first side of the vehicle and a second distance sensor is designed to be situated laterally with regard to a second side of the vehicle, the second side being opposite to the first side. The distance sensors are preferably designed to determine the particular distance through a propagation time measurement.

The vehicle includes a second measuring device for determining an instantaneous pitch angle of the vehicle. For example, the pitch angle may be determined in that the difference between a measured acceleration of the vehicle in the forward direction (x direction) and a specific acceleration is determined with the aid of the wheel rotational speed sensors. The difference corresponds to the acceleration caused by gravity and from which the pitch angle may in turn be derived.

A first distance to a water surface is measured with the aid of the first distance sensor and a second distance to a water surface is measured with the aid of the second distance sensor.

An instantaneous water surface plane is determined as a function of the first distance, the second distance, and the instantaneous pitch angle of the vehicle.

The instantaneous water surface plane is represented in relation to the vehicle with the aid of a display unit of the vehicle.

Particular assigned wading limits are preferably stored, for example in a memory unit of the vehicle, for a plurality of specific positions at the vehicle. Now that the instantaneous water surface plane is known, it may be determined for each of the specific positions, whether the assigned wading limit is above or below the instantaneous water surface plane. The instantaneous distance of the assigned wading limit from the instantaneous water surface plane is preferably determined for each of the specific positions. If the instantaneous distance of a specific position with regard to the assigned wading limit falls below a specific limiting value, a warning may be output, so that the driver is able to respond before the vehicle is damaged through water entering same.

In one preferred embodiment of the method according to the present invention, it is provided to indicate a perspective or three-dimensional illustration of the vehicle together with a perspective or three-dimensional illustration of the instantaneous water surface plane to the driver on a corresponding display unit, in particular in real time.

In this case, a section line of the vehicle outer contour with the instantaneous water surface plane may be illustrated, in particular, in a visually highlighted manner and the instantaneous distances of the specific positions may be indicated with regard to the assigned wading limits. In this way, a particularly intuitive illustration of the instantaneous wading situation is achieved for the benefit of the driver, in which the driver may perceive immediately, whether and where at the vehicle there is the risk of water entering same.

According to a further aspect of the present invention, a computer program product having program code for carrying out a method according to the present invention is provided, if the computer program product runs on a processing unit or is stored on a computer-readable data carrier.

BRIEF DESCRIPTION OF THE DRAWINGS

FIGS. 1a and 1b schematically show a vehicle including a driver assistance system according to one embodiment of the present invention together with a water surface plane.

FIG. 1a shows the vehicle in a front view.

FIG. 1b shows the vehicle in a side view.

DETAILED DESCRIPTION OF EXAMPLE EMBODIMENTS

Figure 1A:
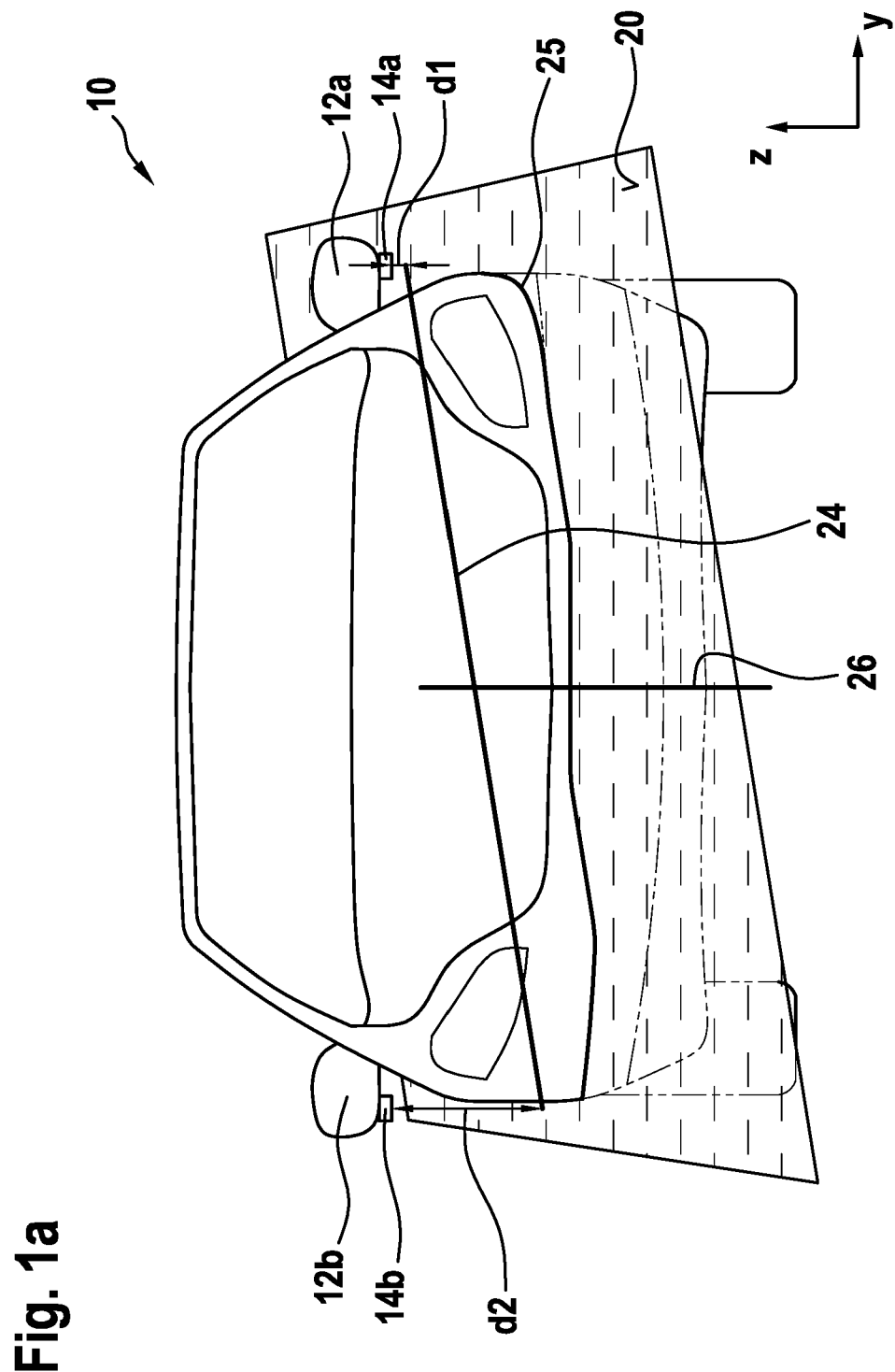

In the description below of the exemplary embodiments of the present invention, identical elements are denoted by the same reference numerals; a repetitive description of these elements is dispensed with. The figures represent the object and subject matters of the present invention only schematically.

FIGS. 1a and 1b schematically show a vehicle 10 including a driver assistance system according to one embodiment of the present invention together with a water surface plane 20, which was determined with the aid of the driver assistance system. The vehicle includes distance sensors 14a and 14b, each being directed downward, at its side mirrors 12a and 12b. Distance sensors 14a and 14b are designed as ultrasonic sensors. Water surface plane 20 is determined in that distances d 1 and d 2 are each initially measured by distance sensors 14a and 14b, respectively. Together with known installation positions $h_1$ and $h_2$ of distance sensors 14a and 14b, a connecting line 24 may now be determined.

In the example illustrated in FIG. 1b, vehicle 10 travels on a roadway 30 inclined upward. If vehicle 30 travels at a consistent speed in the x direction or stands still, a measurable acceleration of vehicle 10 in the x direction is only caused by the inclination of roadway 30, i.e., by the gravitational force. In this case, pitch angle $\theta_{pitch}$ corresponds to the angle of inclination of roadway 30. If vehicle 10 travels in an accelerated manner or brakes (positive or negative acceleration through engine power), a corresponding deviation of pitch angle $\theta_{pitch}$ results. Instantaneous pitch angle $\theta_{pitch}$ may thus be determined with the aid of suitable sensors, for example with the aid of wheel rotational speed sensors and an acceleration sensor (not illustrated), and then used to ascertain a straight line 26. For example, pitch angle $\theta_{pitch}$ may be determined in that the difference between an acceleration of vehicle 10 in the forward direction (x direction) measured by the acceleration sensor and a specific acceleration is determined with the aid of the wheel rotational speed sensors. The difference corresponds to the acceleration caused by the inclination of the roadway, i.e., from gravity, and from which instantaneous pitch angle $\theta_{pitch}$ may in turn be derived.

Water surface plane 20 may now be determined in that the straight line 26 is shifted in parallel to the horizontal (in the z direction) until it intersects with connecting line 24. Both lines 24 and 26 now span water surface plane 20.

Figure 2:
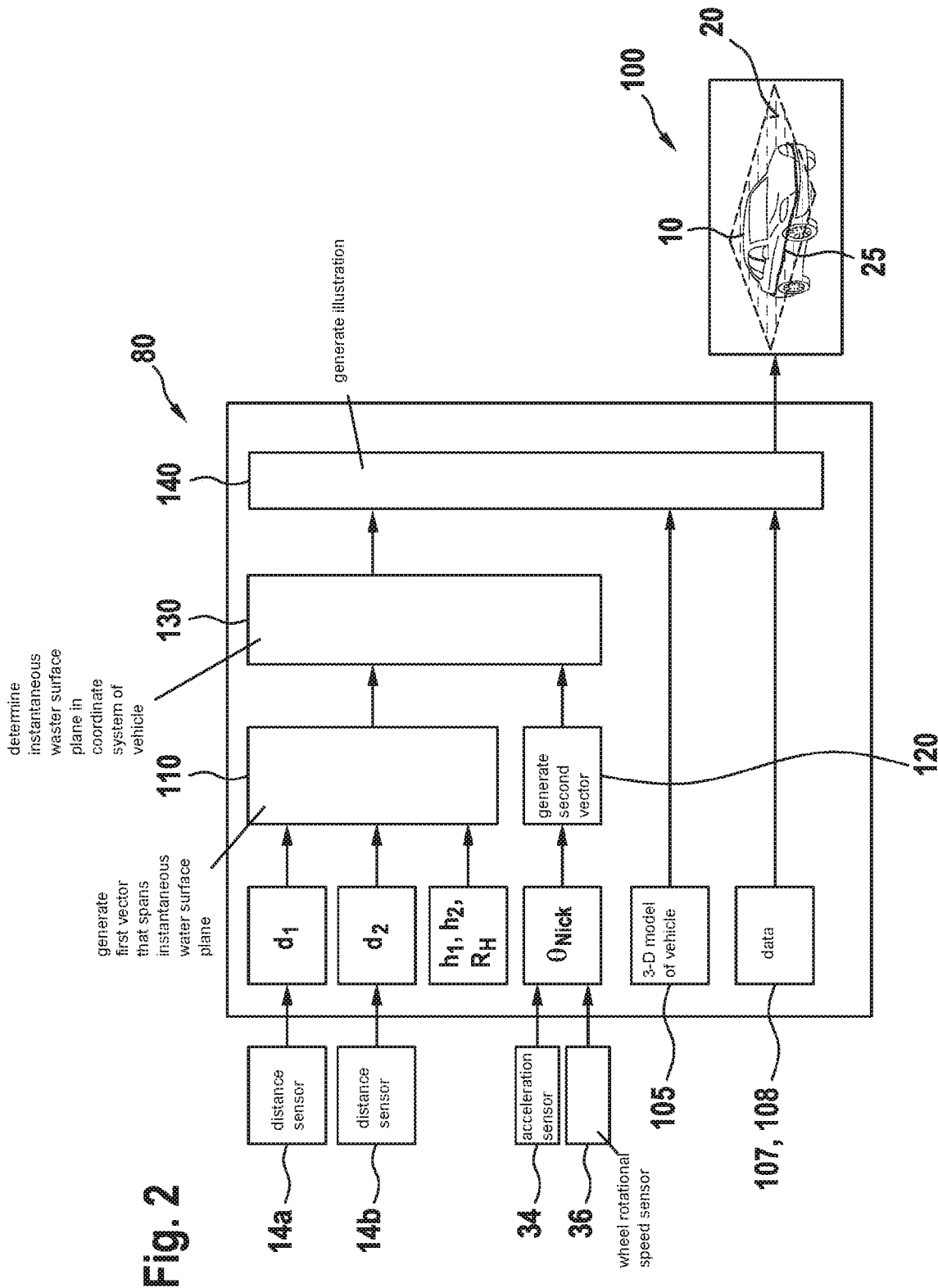
FIG. 2 schematically illustrates a computer program for carrying out a method according to an example embodiment of the present invention as a block diagram.

FIG. 2 shows as a block diagram process 80 of a method according to the present invention, for example by executing a computer program on a processing unit of a driver assistance system according to the present invention. Distance signals $d_1$ and $d_2$, which describe the distance of particular sensor 14a and 14b from the water surface, are generated with the aid of distance sensors 14a and 14b. These may involve the results of individual measurements or mean values from multiple measurements, for example. A first vector that spans the instantaneous water surface plane and that is formed by connecting line 24 is generated in program element 110 from distance signals $d_1$ and $d_2$ as well as known installation positions $h_1$ and $h_2$ of the distance sensors. A variable vehicle height R H may potentially be taken into account. Pitch angle $\theta_{pitch}$ of vehicle 10 is determined from the measured data of an acceleration sensor 34 and the measured data from wheel rotational speed sensors 36. A vector, which is second in program element 120, represented by line 26, and spans instantaneous water surface plane 20, is generated from pitch angle $\theta_{pitch}$. The vectors are used to determine in program step 130 instantaneous water surface plane 20 in a coordinate system of vehicle 10.

For the illustration according to the present invention, a three-dimensional model 105 of the vehicle, in particular of the outer contour of the vehicle, is furthermore provided. This model may be simplified with regard to the real vehicle. Furthermore, data 107 are provided for specific positions at vehicle 10 as well as wading limits 108 individually assigned to these positions. The specific positions include positions at vehicle 10, for example, into which water should not enter, for example positions of air inlets, windows, etc. Wading limits 108 are different from one another, in particular. Vehicle model 105, data 107 on the specific positions at vehicle 10 as well as wading limits 108 assigned to the specific positions are in a memory unit of the driver assistance system, for example, and are retrieved when the method is carried out.

In program step 140, data 105, 107 and 108 of vehicle 10 and computed water surface plane 20 are used to generate an illustration 100 that graphically indicates to the driver the instantaneous wading situation of vehicle 10 on a corresponding display system. In this example, vehicle 10, instantaneous water surface plane 20, and a contour line 25 that represents the section line of water surface plane 20 with the vehicle, are illustrated. In addition, specific positions 107 may also be illustrated at the vehicle and assigned wading limits 108 may be illustrated in a highlighted manner.

What is claimed is:

1. A driver assistance system configured to determine a wading situation of a vehicle, the driver assistance system comprising:
   a first measuring device configured to determine distances to a water surface, the first measuring device including at least two distance sensors, a first distance sensor of the distance sensors being configured to be situated laterally with regard to a first side of the vehicle, and a second distance sensor of the distance sensors being configured to be situated laterally with regard to a second side of the vehicle, the second side being opposite to the first side, the first distance sensor being configured to measure a first distance to a water surface and the second distance sensor being designed to measure a second distance to a water surface;
   a second measuring device configured to determine an instantaneous pitch angle of the vehicle;
   a processing unit coupled to the first measuring device and the second measuring device, the processing unit configured to determine an instantaneous water surface plane as a function of the first distance, the second distance, and the instantaneous pitch angle of the vehicle; and
   a display unit configured to indicate the instantaneous water surface plane in relation to the vehicle,
   wherein the driver assistance system further includes a memory unit, particular assigned wading limits being stored in the memory unit for a plurality of specific positions at the vehicle, and wherein the processing unit is configured to determine, for each of the specific positions, whether the assigned wading limit is above or below the instantaneous water surface plane, wherein the specific positions of the vehicle include positions having air inlets.

2. The driver assistance system as recited in claim 1, wherein the processing unit is configured to determine, for each of the specific positions, an instantaneous distance of the assigned wading limit from the instantaneous water surface plane.

3. The driver assistance system as recited in claim 1, wherein the display unit is configured to output a warning if the instantaneous distance of a specific position of the specific positions falls below a specific limiting value with regard to the assigned wading limit.

4. The driver assistance system as recited in claim 1, wherein the display unit is configured to indicate, in real time, a perspective or three-dimensional illustration of the vehicle together with a perspective or three-dimensional illustration of the instantaneous water surface plane.

5. The driver assistance system as recited in claim 2, wherein the display unit is configured to represent a section line of an outer contour of the vehicle with the instantaneous water surface plane in a visually highlighted manner and to indicate the instantaneous distances of the specific positions with regard to the assigned wading limits.

6. The driver assistance system as recited in claim 1, wherein each of the first distance sensor and the second distance sensor is an ultrasonic sensor.

7. A vehicle, comprising:
   a driver assistance system configured to determine a wading situation of the vehicle, the driver assistance system including:
      a first measuring device configured to determine distances to a water surface, the first measuring device including at least two distance sensors, a first distance sensor of the distance sensors being configured to be situated laterally with regard to a first side of the vehicle, and a second distance sensor of the distance sensors being configured to be situated laterally with regard to a second side of the vehicle, the second side being opposite to the first side, the first distance sensor being configured to measure a first distance to a water surface and the second distance sensor being designed to measure a second distance to a water surface;

a second measuring device configured to determine an instantaneous pitch angle of the vehicle;

a processing unit coupled to the first measuring device and the second measuring device, the processing unit configured to determine an instantaneous water surface plane as a function of the first distance, the second distance, and the instantaneous pitch angle of the vehicle; and a display unit configured to indicate the instantaneous water surface plane in relation to the vehicle, wherein the driver assistance system further includes a memory unit, particular assigned wading limits being stored in the memory unit for a plurality of specific positions at the vehicle, wherein the processing unit is configured to determine, for each of the specific positions, whether the assigned wading limit is above or below the instantaneous water surface plane, and wherein the specific positions of the vehicle include positions having air inlets.

8. The vehicle as recited in claim 7, wherein the first distance sensor and the second distance sensor are each situated at a respective side mirror of the vehicle.

9. A method for determining a wading situation of a vehicle, wherein the vehicle includes a first measuring device configured to determine distances to a water surface including at least two distance sensors, a first distance sensor of the distance sensors being configured to be situated laterally with regard to a first side of the vehicle and a second distance sensor of the distance sensors being configured to be situated laterally with regard to a second side of the vehicle, the second side being opposite to the first side, and the vehicle including a second measuring device for determining an instantaneous pitch angle of the vehicle, the method comprising the following steps:

measuring a first distance to a water surface using the first distance sensor;

measuring a second distance to the water surface using the second distance sensor;

determining an instantaneous water surface plane as a function of the measured first distance, the measured second distance, and the instantaneous pitch angle of the vehicle; and indicating the instantaneous water surface plane in relation to the vehicle using a display unit of the vehicle, wherein particular assigned wading limits are provided for a plurality of specific positions at the vehicle, and the method further comprising:

determined, for each of the specific positions, whether the assigned wading limit is above or below the instantaneous water surface plane, and wherein the specific positions of the vehicle include positions having air inlets.

10. The method as recited in claim 9, further comprising: determining, for each of the specific positions, an instantaneous distance of the assigned wading limit from the instantaneous water surface plane.

11. The method as recited in claim 10, further comprising: outputting a warning based on the instantaneous distance of a specific position of the specific positions falling below a specific limiting value with regard to the assigned wading limit.

12. The method as recited in claim 9, wherein, in real time, a perspective or three-dimensional illustration of the vehicle together with a perspective or three-dimensional illustration of the instantaneous water surface plane is displayed using the display unit.

13. The method as recited in claim 10, wherein a section line of an outer contour of the vehicle is illustrated together with the instantaneous water surface plane in a visually highlighted manner and the instantaneous distances of the specific positions are displayed with regard to the assigned wading limits.

14. The method as recited in claim 9, wherein the first distance and the second distance are each determined through a propagation time measurement.

15. A non-transitory computer-readable data carrier on which is stored program code for determining a wading situation of a vehicle, wherein the vehicle includes a first measuring device configured to determine distances to a water surface including at least two distance sensors, a first distance sensor of the distance sensors being configured to be situated laterally with regard to a first side of the vehicle and a second distance sensor of the distance sensors being configured to be situated laterally with regard to a second side of the vehicle, the second side being opposite to the first side, and the vehicle including a second measuring device for determining an instantaneous pitch angle of the vehicle, the program code, when executed by a computer, causing the computer to perform the following steps:

measuring a first distance to a water surface using the first distance sensor;

measuring a second distance to the water surface using the second distance sensor;

determining an instantaneous water surface plane as a function of the measured first distance, the measured second distance, and the instantaneous pitch angle of the vehicle; and indicating the instantaneous water surface plane in relation to the vehicle using a display unit of the vehicle, wherein particular assigned wading limits are provided for a plurality of specific positions at the vehicle, and the method further comprising:

determined, for each of the specific positions, whether the assigned wading limit is above or below the instantaneous water surface plane, and wherein the specific positions of the vehicle include positions having air inlets.

* * * * *